Patented Mar. 16, 1943

2,313,757

UNITED STATES PATENT OFFICE 2,313,757

VINYLIDENE CHLORIDE COMPOSITION STABLE TO LIGHT

Lorne A. Matheson and Raymond F. Boyer, Midland, Mich., assignors to The Dow Chemical Company, Midland, Mich., a corporation of Michigan No Drawing. Application September 19, 1940, Serial No. 357,405

8 Claims. (Cl. 260—80)

The present invention relates to compositions comprising polymeric vinylidene chloride products and certain light stabilizers therefor.

The polymers of vinylidene chloride alone, its copolymers with other polymerizable materials, various plasticized compositions thereof, and certain ways in which they may be made, are described in U. S. Patents Nos. 2,160,903–4 and 2,160,931–948. The polymers of vinylidene chloride alone and its co-polymers and plasticized compositions are herein referred to as "polymeric vinylidene chloride products". These products, or most of them, are capable of being molded to form useful articles under the combined effects of heat and pressure. Some of them exhibit sufficient solubility in certain solvents, more particularly at elevated temperatures, to permit their being cast as films. In most cases, the articles produced either by molding, extrusion, or by casting from solution of polymeric vinylidene chloride products are subject to decomposition when exposed for prolonged periods to the effects of light. This appears to be particularly true of articles having thin cross section, especially when they are subjected to the effects of ultraviolet light. This apparent shortcoming of articles produced from polymeric vinylidene chloride products makes it highly desirable to obtain stabilizers for these products which will prevent or at least minimize the darkening effect heretofore observed when the products have been exposed to light.

It is accordingly among the objects of the present invention to provide a polymeric vinylidene chloride product stabilized against the darkening and embrittling effects of light. Another object is to provide a composition comprising a polymeric vinylidene chloride product and a light stabilizer therefor. Particular objects will appear hereinafter.

We have now found that the foregoing and related objects may be attained through the incorportion in a polymeric vinylidene chloride product of an unsaturated organic ester wherein either the alcoholic residue or the acid residue, or both, is unsaturated. Such esters have the general formula

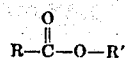

wherein at least one of the radicals R and R' contains non-benzenoid unsaturation, i. e., real or active unsaturation rather than the relatively inactive unsaturation in the benzene and other aromatic rings. It is to be understood that the radical R in the above formula may contain other carboxyl groups than the one shown, and that these may or may not be esterified with radicals R'. A wide variety of such unsaturated esters have been tested and shown to be effective light stabilizing agents for polymeric vinylidene chloride products. A number of these esters will be specifically designated hereinafter. The unsaturated esters employed as stabilizers may be incorporated in the polymer product in amounts which generally vary in the range from about 1 to about 10 per cent, based on the weight of the polymer to be stabilized.

The stabilizer, which in this case is an unsaturated ester, may be added to the polymeric product in any of various ways. For example, if the polymer or co-polymer is capable of being dispersed or dissolved in an organic solvent, the stabilizer may be added to such solution and the stabilized polymeric product obtained from the solution in the desired form. Alternatively, the polymeric product may be milled with the stabilizer, either with or without the aid of volatile dispersion media, on compounding rolls in the methods well known in the art.

Regardless of the manner in which the herein concerned stabilizers are added to the polymeric products, it has been found that they exhibit a remarkable stabilizing effect on the polymer when the latter is exposed to light. Thus, an untreated film or filament of a polymeric vinylidene chloride product may assume a dark brown or black coloration after exposure to sunlight. By way of contrast, the composition containing relatively small amounts of the stabilizers herein enumerated and others of the same class, when exposed to sunlight in like manner and in the same physical state, will resist discoloration for periods up to several months or longer.

The unsaturated esters which may be employed for the present purpose include a wide variety of carboxylic acid esters wherein either or both of the characterizing radicals in the esters may be unsaturated. Compounds of this type which have been found to be particularly effective include, among others, the ethyl, propyl, butyl, glyceryl, and benzyl esters of such unsaturated acids as acrylic acid, methacrylic acid, cinnamic acid, fumaric acid, maleic acid, itaconic acid, crotonic acid, furacrylic acid, linoleic acid, eleostearic acid, and the like. In each of the foregoing, the acid residue in the molecule is the unsaturated portion, while the alcohol residue is of the saturated type. Other esters which have been found effective include the vinyl, allyl, 2-methyl allyl, 2-chloroallyl, crotonyl, and cinnamyl esters of oxalic acid, malonic acid, tartaric acid, malic acid, adipic acid, sebacic acid, benzoic acid, salicyclic acid, phthalic acid, naphthoic acid, and the like. In the list just given, the unsaturated portion of the molecule is, in each case, to be found in the alcoholic residue therein. It is, of course, to be understood that the esters contemplated for the present purpose in the broad terms of the appended claims include those in which both the acid and alcohol radicals are unsaturated. A few examples of such esters given purely by way of illustration and not of limitation are allyl acrylate, diallyl maleate, cinnamyl cinnamate, and the like. The foregoing lists have enumerated many unsaturated alcohol radicals and many unsaturated acids as well as certain saturated alcohols and acids. It is contemplated then that esters made from each permutation of the suggested acids and alcohols is individually disclosed as operative, so long as one of the characterizing groups in the esters is unsaturated.

The following example illustrates the utilization of but a few of the esters herein suggested as light stabilizers for a polymeric vinylidene chloride product:

The polymeric product employed in the test to be reported below was a co-polymer of about 90 per cent vinylidene chloride and correspondingly about 10 per cent of ethyl acrylate. To each of numerous samples of this co-polymer was added an amount within the range from about 1 to about 10 per cent of the stabilizer to be tested. The stabilizers were uniformly distributed through the polymer either by a blending operation carried out on compounding rolls or by the deposition of the polymer and stabilizer from a common solution of the two ingredients. Uniformly thin sheets of the stabilized compositions were prepared and exposed to ultraviolet light in a standard fadeometer for a period of about 48 hours. An observation was made of the per cent of the available visible light which was transmitted through the samples both before and after exposure in the fadeometer. The change in the amount of light transmitted gives an indication of the amount of darkening and hence of decomposition on exposure to light.

*Table*

| Stabilizer | Percent visible before | Transmission after 48 hours |
|---|---|---|
| Blanks (average of 10) | 89 | 60 |
| Diethyl itaconate (1.0%) | 90 | 82 |
| Diethyl itaconate (5.0%) | 87 | 83 |
| Diallyl maleate (1.0%) | 89 | 70 |
| Diallyl maleate (3.0%) | 90 | 76 |
| Diallyl maleate (10.0%) | 89 | 86 |
| Tung oil (3.0%) | 91 | 70 |
| Di-(1-chloro-2-propyl)-4-cyclohexene-1.2-dicarboxylate (10.0%) [1] | 91 | 80 |
| Diallyl sebacate (10.0%) | 90 | 79 |
| Dibutyl maleate (10.0%) | 88 | 79 |
| 2-phenoxy-ethyl cinnamate (10.0%) | 87 | 78 |
| Di-(2-phenoxy-ethyl)-fumarate (3.0%) | 89 | 70 |
| 2-(4-tertiarybutyl-phenoxy)-ethyl crotonate (10.0%) | 90 | 81 |
| 2-phenoxy-ethyl-furacrylate (3.0%) | 90 | 66 |

[1] $(C_6H_8(CO_2C_3H_6Cl)_2.)$

It is observed that each of the unsaturated esters reported in the foregoing table improves the ability of the polymeric vinylidene chloride product to withstand the effects of continued exposure to light. Numerous other unsaturated esters of the type hereinbefore defined under like conditions are found to give comparable results.

The invention has been illustrated with particular reference to the co-polymer of vinylidene chloride and ethyl acrylate. It is to be understood that the invention is not limited to its use in connection with this co-polymer but that it may be applied equally as effectively to other co-polymers of vinylidene chloride such as those with vinyl chloride, vinyl acetate, styrene, methyl methacrylate, and the like. In its practical application, the invention appears to be limited only by the requirement that the polymeric vinylidene chloride product to be treated is one which, without a light stabilizing agent, shows evidence of decomposition when exposed to light.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:

1. A composition of matter comprising a polymeric vinylidene chloride product, and, as a stabilizing agent therefor, an ester selected from the group consisting of alkenyl and aralkenyl esters of carboxylic acids and esters of unsaturated carboxylic acids wherein the unsaturation is non-benzenoid in character.

2. A composition of matter comprising a polymeric vinylidene chloride product, and, as a stabilizing agent therefor, an alkenyl ester of a carboxylic acid.

3. A composition of matter comprising a polymeric vinylidene chloride product, and, as a stabilizing agent therefor, an organic ester of an unsaturated carboxylic acid wherein the unsaturation is non-benzenoid in character.

4. A composition of matter comprising a polymeric vinylidene chloride product, and, as a stabilizing agent therefor, an ester of itaconic acid.

5. A composition of matter comprising a polymeric vinylidene chloride product, and, as a stabilizing agent therefor, diethyl itaconate.

6. A composition of matter comprising a polymeric vinylidene chloride product, and, as a stabilizing agent therefor, an allyl ester of a dicarboxylic acid.

7. A composition of matter comprising a polymeric vinylidene chloride product, and, as a stabilizing agent therefor, diallyl maleate.

8. A composition of matter comprising a polymeric vinylidene chloride product, and, as a stabilizing agent therefor, diallyl sebacate.

LORNE A. MATHESON.
RAYMOND F. BOYER.